F. A. HART.
COMBINED TYPE WRITING AND COMPUTING MACHINE.
APPLICATION FILED MAY 16, 1914.

1,281,953.

Patented Oct. 15, 1918.
9 SHEETS—SHEET 3.

WITNESSES:
E. A. Rennie
W. O. Westphal

INVENTOR:
Frederick A. Hart
BY D. C. Stickney
ATTORNEY.

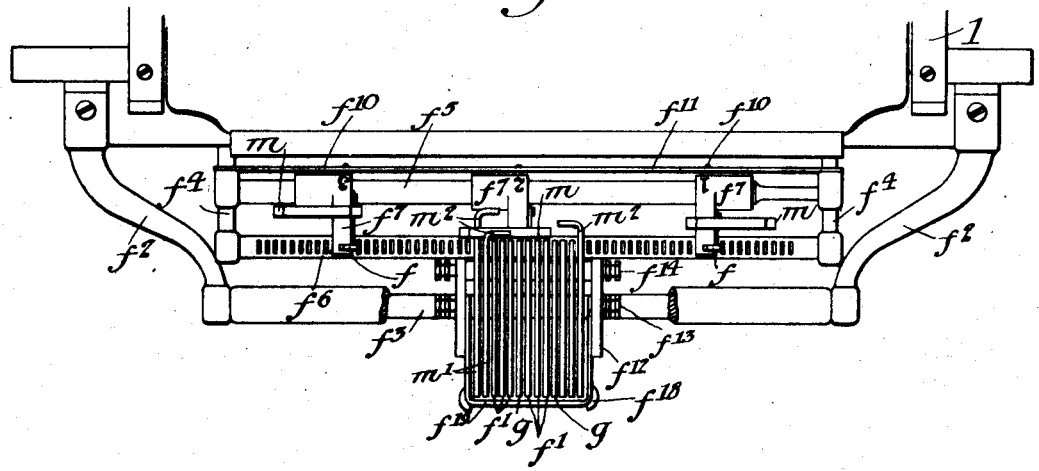
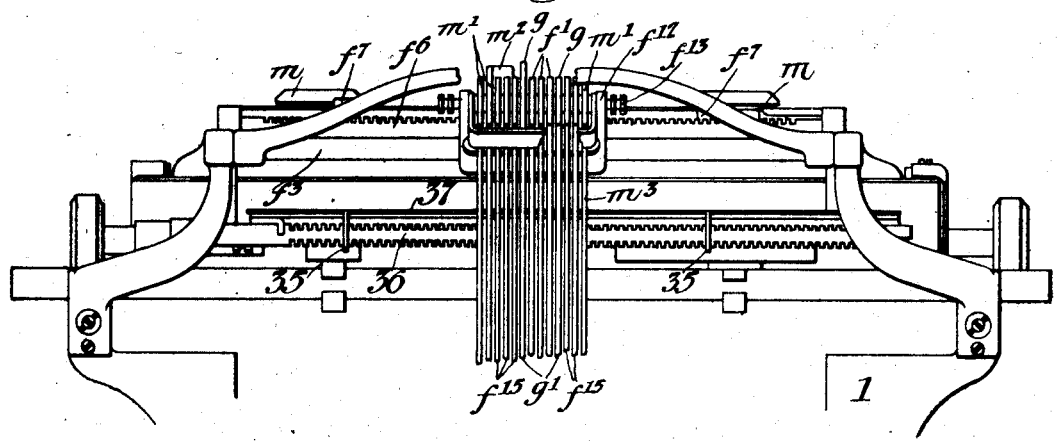

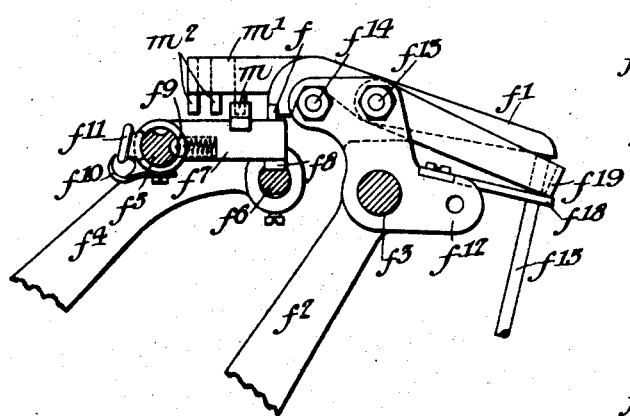
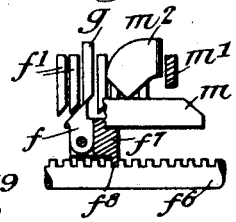
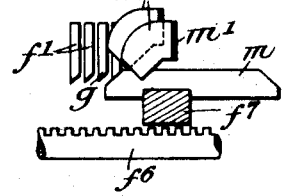
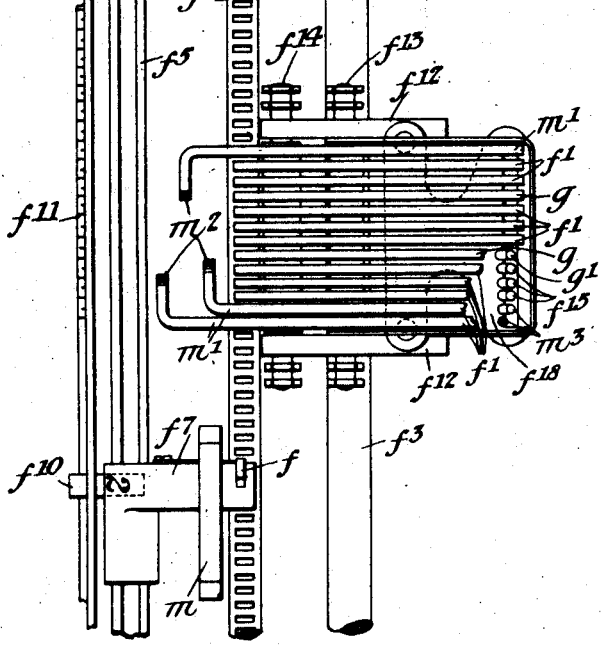

F. A. HART.
COMBINED TYPE WRITING AND COMPUTING MACHINE.
APPLICATION FILED MAY 16, 1914.
1,281,953.
Patented Oct. 15, 1918.
9 SHEETS—SHEET 6.
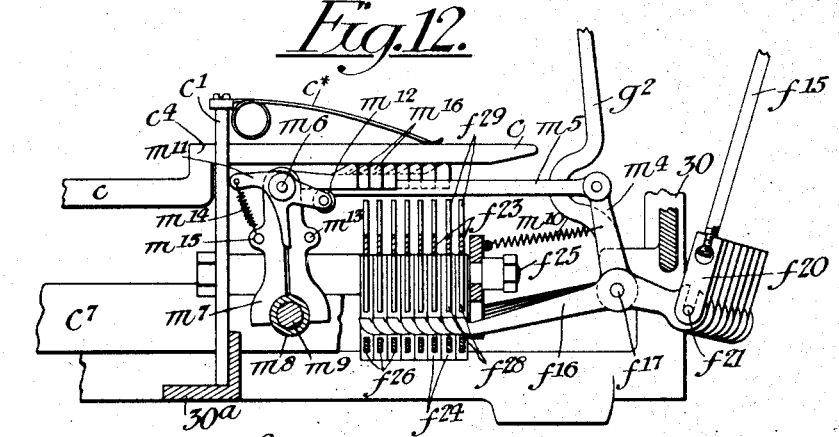
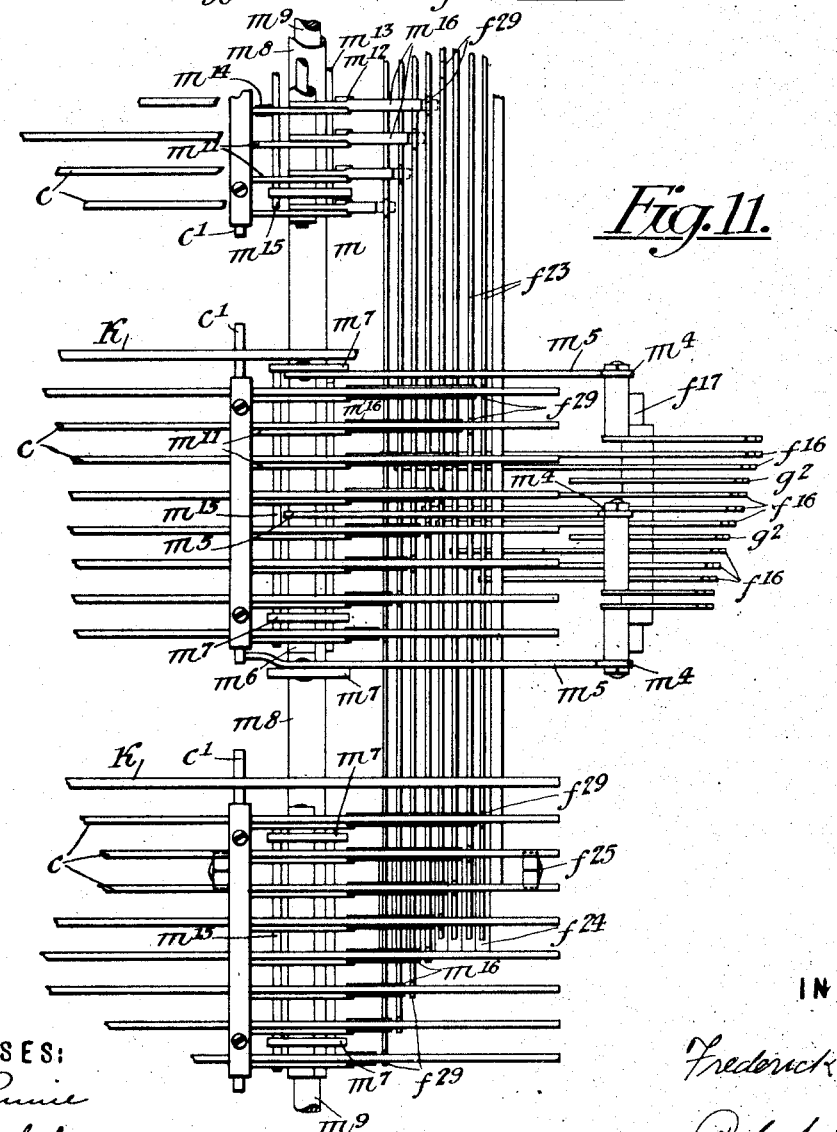

F. A. HART.
COMBINED TYPE WRITING AND COMPUTING MACHINE.
APPLICATION FILED MAY 16, 1914.
1,281,953.
Patented Oct. 15, 1918.
9 SHEETS—SHEET 7.
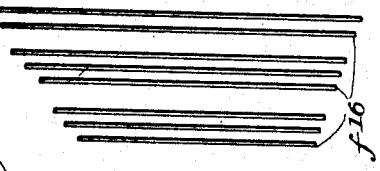
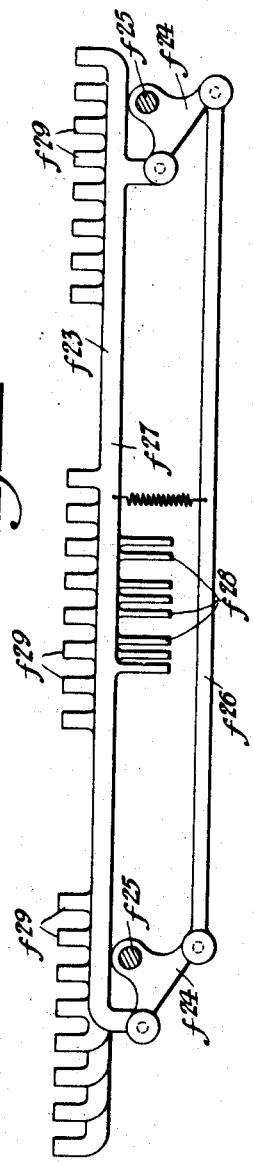
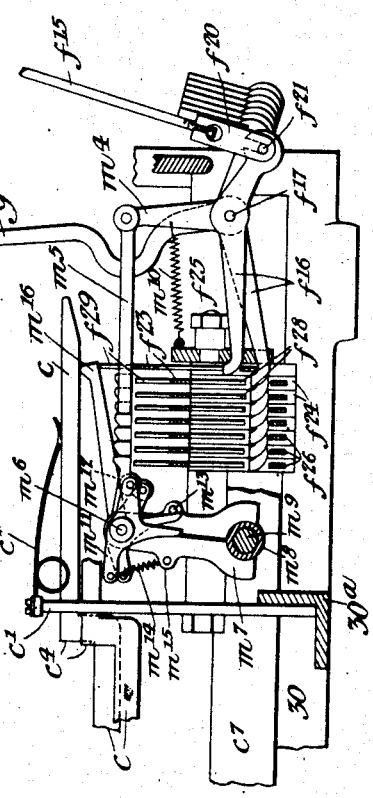
WITNESSES:
INVENTOR:
Frederick A. Hart
BY
ATTORNEY.

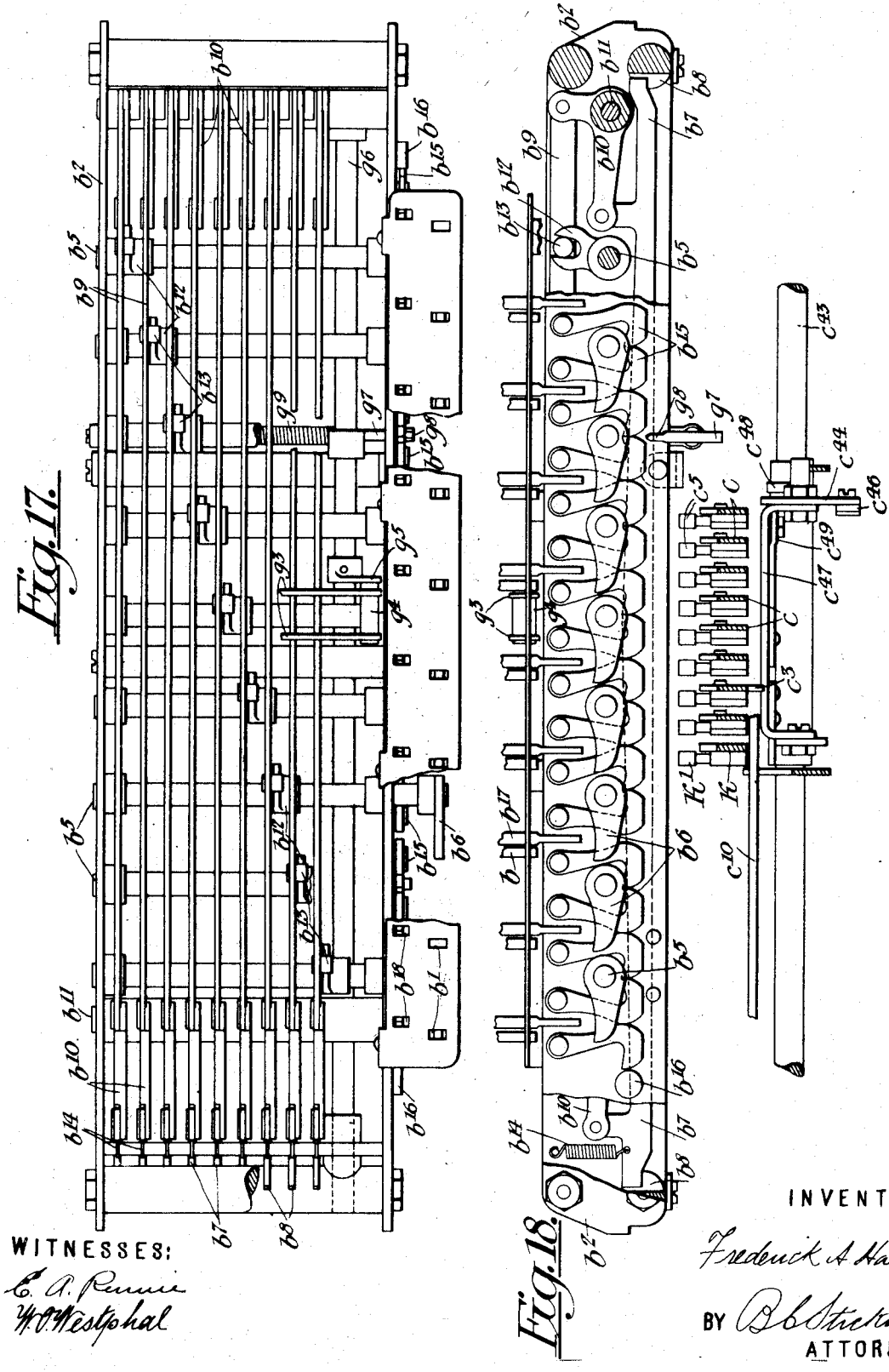

UNITED STATES PATENT OFFICE.

FREDERICK A. HART, OF NEWARK, NEW JERSEY, ASSIGNOR, BY MESNE ASSIGNMENTS, TO UNDERWOOD COMPUTING MACHINE COMPANY, OF NEW YORK, N. Y., A CORPORATION OF NEW YORK.

COMBINED TYPE-WRITING AND COMPUTING MACHINE.

1,281,953.        Specification of Letters Patent.      Patented Oct. 15, 1918.

Application filed May 16, 1914. Serial No. 838,930.

*To all whom it may concern:*

Be it known that I, FREDERICK A. HART, a citizen of the United States, residing in Newark, in the county of Essex and State of New Jersey, have invented certain new and useful Improvements in Combined Type-Writing and Computing Machines, of which the following is a specification.

My invention relates to computing machines and to combined typewriting and computing machines, and broadly stated, has for its object to improve the construction and operation of machines of this general character.

To the above ends the invention consists of the novel devices and combinations of devices hereinafter described and defined in the claims.

In many respects, this improved machine is, or may be, identical with that disclosed and claimed by me in a companion application, No. 466,836, filed December 10, 1908, (now Patent No. 1,270,411, dated June 25, 1918), and like the present application, entitled, Computing machines and combined typewriting and computing machines; and like said co-pending application, this application relates particularly to the improvement of combined typewriting and computing machines of the type disclosed and broadly claimed in Letters Patent of the United States issued to Hans Hanson, No. 816,319 of date March 27, 1906, No. 905,421 of date December 1, 1908, and No. 905,422 of date December 1, 1908.

The present invention is directed chiefly to the modified or improved form of the decimal order selecting mechanism of my companion application, and it comprises a plurality of decimal order selecting dogs, one for each register, a corresponding number of register selectors, a common set of decimal order selecting levers upon which the several decimal order selecting dogs operate in succession, and a set of transposing bars subject to said selecting levers and common to the several registers. The register selectors serve to determine on which register the decimal order selecting mechanism shall be operative, and the selecting action of the latter is transmitted to the various registers, through the said common so-called transposing bars.

In the accompanying drawings which illustrate the invention, like characters indicate like parts throughout the several views.

Referring to the drawings:

Fig. 4 is a plan view with some parts broken away, showing certain of the rear parts of the typewriter frame and typewriter carriage, and particularly illustrating the single group of upper decimal order selecting levers, and the so-called register selector or register selecting mechanism.

Fig. 5 is a rear elevation of the parts shown in Fig. 4, some parts being broken away.

Fig. 6 is a plan view of certain of the parts shown in Fig. 4, showing the same on a larger scale.

Fig. 7 is a vertical section taken on the line $x^7$ $x^7$ of Fig. 6.

Fig. 8 is a section taken on the line $x^8$ $x^8$ of Fig. 7.

Fig. 9 is a section taken on the line $x^9$ $x^9$ of Fig. 7.

Fig. 10 is a detail with some parts broken away, showing a guide for the upper ends of the lever connecting rods of the decimal order selecting mechanism, of the punctuation-space key-locking mechanism, and of the register selecting mechanism.

Fig. 11 is a fragmentary plan view showing particularly the register bars and lower portions of the register selector and decimal order selecting mechanism, including the so-called transposing bar.

Fig. 12 is a vertical section taken on the line $x^{12}$ $x^{12}$ of Fig. 11.

Fig. 13 is a vertical section corresponding to Fig. 12, but illustrating different positions of the parts.

Fig. 14 is a transverse vertical section taken approximately on the line $x^{14}$ $x^{14}$ of Fig. 2, some parts being removed.

Fig. 15 is a diagrammatic view, showing the lower group of so-called selecting levers.

Fig. 17 is a detail view in plan, with some parts broken away and some parts removed, showing the so-called unit bars and associated parts; and Fig. 18 is a front elevation of the parts shown in Fig. 17, showing also underlying register bars, unit pins and certain other coöperating parts, the said unit bars being sectioned.

*Typewriter and computer case.*

In the following detailed description, those parts herein shown, which are identical with corresponding parts shown in my said companion application, will be indicated by the same characters that are applied thereto in the said companion application.

The typewriter illustrated is a No. 5 Underwood, the construction and operation of which are well understood, and hence, for the purposes of this case, will be but briefly noted.

Figure 1:
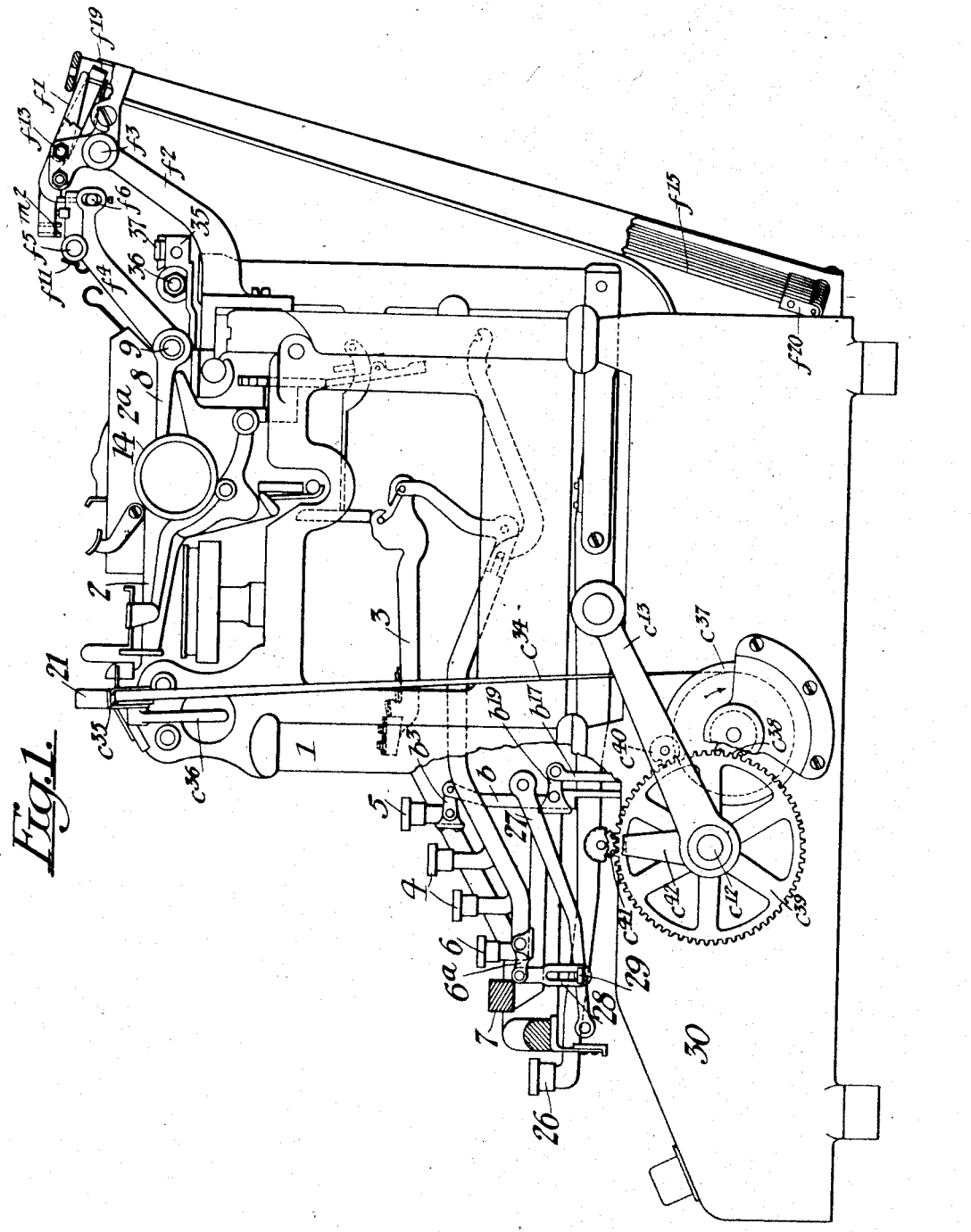
Figure 1 is a view in side elevation with some parts broken away, showing the typewriting and computing machine.

Directing attention particularly to Figs. 1, 4 and 5, the numeral 1 represents the typewriter frame, the numeral 2 the typewriter carriage, the numeral 3 the type bars, the numeral 4 the character keys, the numeral 5 the numeral keys, the numeral 6 one of the shift keys, and the numeral 7 the spacing bail or space bar. All of these keys are of course, spring held in their uppermost or normal positions.

The typewriter carriage 2 has a vertically movable supplemental frame 2ª, that is held for parallel movements by arms 8, connected to a rock shaft 9, mounted in suitable bearings on the carriage 2. This supplemental frame or section of the typewriter carriage, carries the customary platen or paper supporting roller 14, and by depression of either of the shift keys, it will be given vertical movement, through the usual connections, not shown. The numeral 21 indicates the spring held line feeding lever which is connected with the platen roller 14 in the customary way, through a pawl and ratchet device, (not shown), so that when the said lever is moved toward the right, the roller and paper will be moved one step, as required for the line feed. The typewriter carriage is under spring tension from a suitable motor spring, (not shown), and moves from right toward the left, with a step by step motion, under the control of a suitable escapement that is subject to the key action.

In Fig. 1, the numeral 26 indicates one of several upwardly spring pressed tabulating keys which operate, in the usual way, to release the typewriter carriage, for tabulating purposes; and the numerals 35, 36 and 37, (see Fig. 5), indicate respectively, the adjustable tabulating stops, the notched stop supporting bar and the coöperating scale of the tabulating mechanism.

All of the parts of the typewriter so far described are found in the No. 5 Underwood, equipped with tabulating mechanism, and which as above stated, is the typewriting machine illustrated in the drawings.

Although of no great importance to this application, because disclosed and claimed in my said companion application, it may however, be stated, that the depression of any tabulating key depresses also one of the shift keys 6 (as shown the right hand shift key), while the depression of said shift key will not depress any of said tabulating keys; and that this is accomplished by means of an upwardly spring pressed bail 27 pivotally connected to the typewriter frame 1, with its transverse free portion underlying all of said tabulating keys; and by a link 28 pivotally connected to an extension 6ª of said shift key and having a slot that is engaged by a stud 29 on one side of the bail 27, as shown in Fig. 1.

The computer case upon which the typewriter frame is detachably mounted, and within or upon which, most of the parts of the computing mechanism are directly or indirectly mounted, is indicated by the numeral 30, and as shown, it is of rectangular box-like form, and is provided with various bearings and shafts and other parts, that will be particularly noted in connection with other groups of mechanisms.

*The register.*

For the purpose of independently listing and adding numbers in several columns on a sheet of paper, the machine herein illustrated, like the machine illustrated in my companion application, is provided with several registers, but these are associated with decimal order selecting mechanism and with so-called register selecting mechanism, which as will hereinafter more clearly appear, constitute the main features of novelty of this application.

These registers are, or may be, identical with the register disclosed and claimed in the patent of Hans Hanson, No. 905,421, dated December 1, 1908, and hence, only a few of the parts thereof will be noted. Each register comprises a group of decimal order digit bearing wheels $a$, all as shown, mounted on the cross shaft $a^1$. On their hubs, the register wheels $a$ have loosely mounted gears $a^2$ connected therewith through ratchet and oneway ball clutches, not shown, and these gears mesh with the teeth of underlying register bars, and are subject to the action of the latter, when the so-called operating carriage of the computer is moved forward. The register wheels are held against accidental movements by spring pressed levers $a^6$, mounted on a transverse rod $a^7$. On the parallel cross shaft $a^8$, are mounted certain wheels constituting parts of the tens-carrying mechanism, two of these only appearing in the drawings, to-wit, the six-toothed wheel $a^9$, and the three-toothed wheel $a^{10}$. On another cross shaft $a^{14}$, is mounted a series of gear segments or toothed arms $a^{16}$, which coöperate with the parts of the shaft $a^8$ in the tens-carrying action.

*Unit bars and their connection to numeral keys of the typewriter.*

These devices are identical with those in my co-pending application, and differ only in detail from the corresponding devices of the said Hanson Letters Patent. By reference to Fig. 1, it will be noted that the numeral keys 5 are provided with depending push bars $b$, that work through guide slots in the forwardly projecting flange of a transversely extended rectangular frame $b^2$, supported from the computer case 30. As shown, the push bars $b$ are pivotally connected to coupling brackets $b^3$, which in turn are pivotally and adjustably connected to said numeral keys. In the frame $b^2$ are journaled a series of nine rock shafts $b^5$, spring held in their normal positions, and extending in a direction from front toward the rear of the computer case. At their forwardly projecting ends, each underlying the lower end of one of the push bars $b$, said rock shafts are provided with arms $b^6$ that are adapted to be engaged by the corresponding push bars $b$, when the corresponding key 5 is depressed.

Mounted for vertical movement in the frame $b^2$ are nine so-called unit bars $b^7$, that are parallel to each other and extend at a right angle to the rock shafts $b^5$, or in other words, extend transversely of the computer case 30 and of the underlying register bars $c$, presently to be described. As shown in Fig. 18, the ends of the unit bars $b^7$ work in grooves $b^8$ cut in the lower transverse end bars of the frame $b^2$ and are thereby held against lateral movements. Each unit bar $b^7$ is coupled to a corresponding overlying tie bar $b^9$, by a pair of bell-cranks $b^{10}$ which are loosely mounted on fulcrum rods $b^{11}$ secured to the sides of the frame $b^2$.

Each rock shaft $b^5$ has a short arm $b^{12}$ (see Figs. 17 and 18) shown as provided with a slotted end that engages a stud $b^{13}$ on the corresponding tie bar $b^9$. These arms $b^{12}$ (see Fig. 17) are arranged on an oblique line, so that the numeral keys from lower to higher orders, or in a direction from left toward the right, are coupled to, or operative on, the series of unit bars located successively from the front toward the rear of the machine.

As shown in Fig. 18, $b^{14}$ indicates coiled springs which yieldingly pull the unit bars $b^7$ upward and normally hold the same and the coöperating bell-cranks $b^{10}$, tie bars $b^9$, rock shafts $b^5$ and arms $b^6$ and $b^{12}$, in the positions shown in Figs. 17 and 18.

With the construction described, it is evident that the depression of one of the numeral keys will result in the depression of the corresponding unit bar $b^7$. It will also be noted, particularly by reference to Fig. 18, that a very considerable portion of the downward movement of the depressed numeral key, is required to bring the connected push bar $b$ into engagement with the corresponding rock shaft arm $b^6$; and in this connection, it may be also noted that the upper arms of the bell-cranks $b^{10}$ are very short as compared with the lower arms thereof, so that a very small portion of the final downward movement of a numeral key is required to effect a considerable downward movement of the corresponding unit bar. The especial object of this construction is to provide for very light "touch" and rapid successive movements of the numeral keys, by depending very largely upon the momentum of the type bars to operate the units bars $b^7$.

For coöperation with other parts, to lock the numeral keys 5 in normal or in-operative positions under several different operations, a series of rockers or cam blocks $b^{15}$ is provided, and these so-called rockers, as shown, are pivotally connected to the vertical front plate or side of the frame $b^2$ and are arranged to work between a pair of stops $b^{16}$ on the said frame plate. As shown in Figs. 17 and 18, there is but little play or space between said rockers $b^{15}$ and the stops $b^{16}$.

For coöperation with the said rockers $b^{15}$, to prevent the operation of more than one numeral key at a time, that is, to lock all other numeral keys in their normal positions, or in positions in which they cannot be made to operate either the printing or computing mechanisms when any one of the numeral keys is operatively depressed, each of said numeral keys is provided with a depending lock stem that is arranged to be forced downward between the underlying two adjacent rockers, and thereby take up all play between the rockers and stops $b^{16}$. These lock stems $b^{17}$ are preferably individual members that work through slots $b^{18}$ in the forwardly projecting flange of the frame $b^2$, and at their upper ends, are pivotally connected to coupling brackets $b^{19}$, intermediately pivoted to the intermediate portions of the respective bars $b$, and adjustably secured thereto by opposing suitable set screws. The adjustable coupling brackets $b^3$ and $b^{19}$ permit of very accurate adjustment of the bars $b$ and stems $b^{17}$, in respect to the coöperating rock shaft arms $b^6$ and rockers $b^{15}$, so that the precise relative times of action thereof may be properly regulated. By reference to Fig. 18, it will be noted that the lower ends of the stems $b^{17}$ will be engaged with the coöperating rockers $b^{15}$ before the corresponding bars $b$ will be engaged with the coöperating rock shaft arms $b^6$.

It may be further added that the play between the rockers $b^{15}$ and stops $b^{16}$ is only sufficient to allow one of the lock stems $b^{17}$ to be forced downward between the said rockers at any one time.

The long upwardly extended arms of the bell-cranks $g^2$ are pivotally connected to the rear ends of forwardly extended connecting links $g^3$, the front ends of which are attached, by slot and pin constructions $g^4$, to the free ends of upwardly extended arms $g^5$, rigidly secured to a rock shaft $g^6$, that is mounted in suitable bearings on the end portions of the unit bar frame $b^2$. This rock shaft $g^6$ has a forwardly curved lock arm $g^7$, the reduced free end $g^8$ of which is adapted to be forced between two of the rockers $b^{15}$ but normally stands in an inoperative position below the same. When the said end $g^8$ of the lock arm $g^7$ is forced between the said rockers $b^{15}$, all play between the rockers will be taken up so that no one of the numeral keys can be depressed to an extent sufficient to cause the printing of a numeral in a punctuation space, as will be herein later more fully described.

*Decimal order register bars, unit pins or preliminary representation devices, operating carriage and associated parts.*

Figure 2:
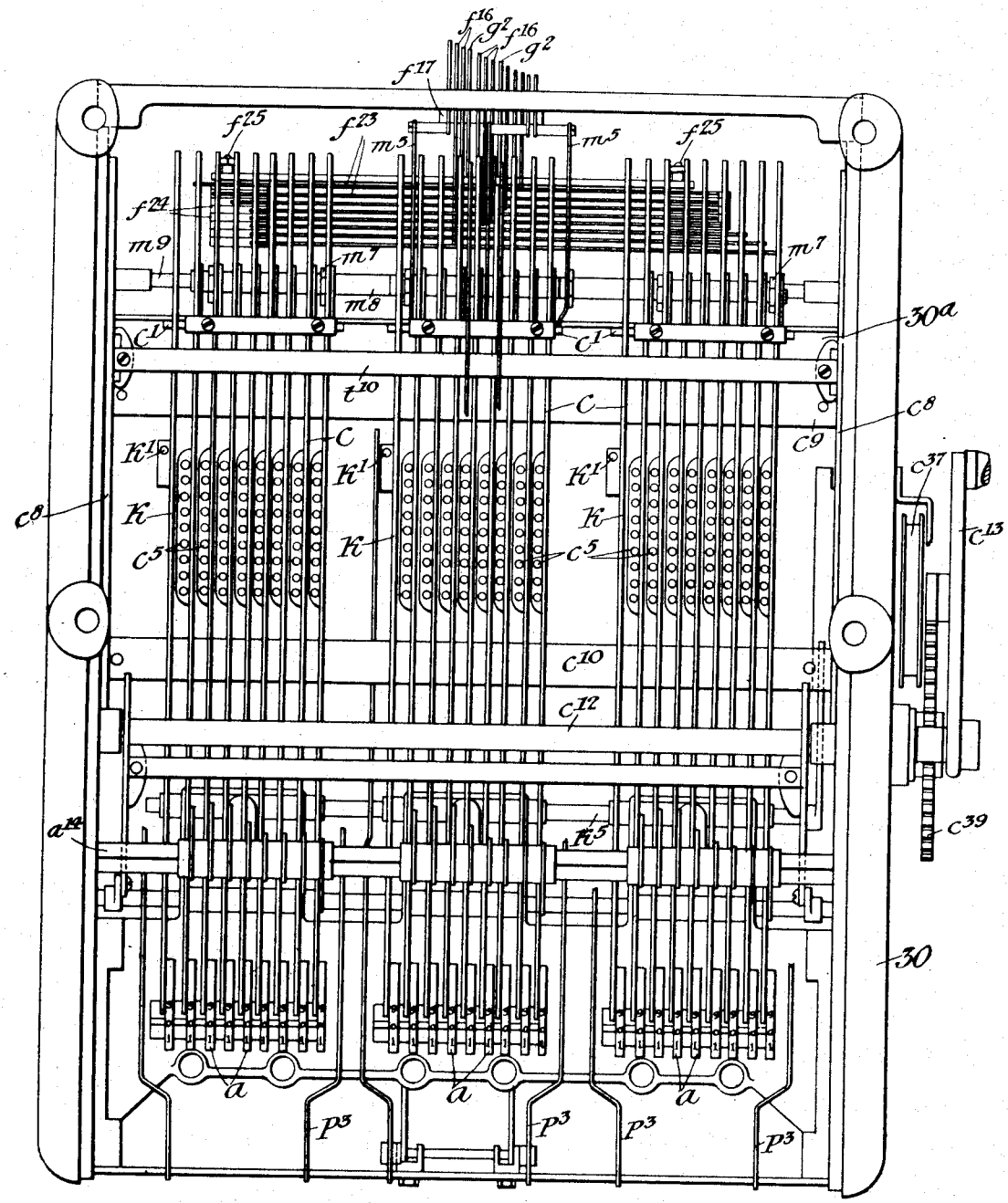
Fig. 2 is a plan view of the computing machine proper, with some parts broken away, and with some parts removed.
Figure 3:
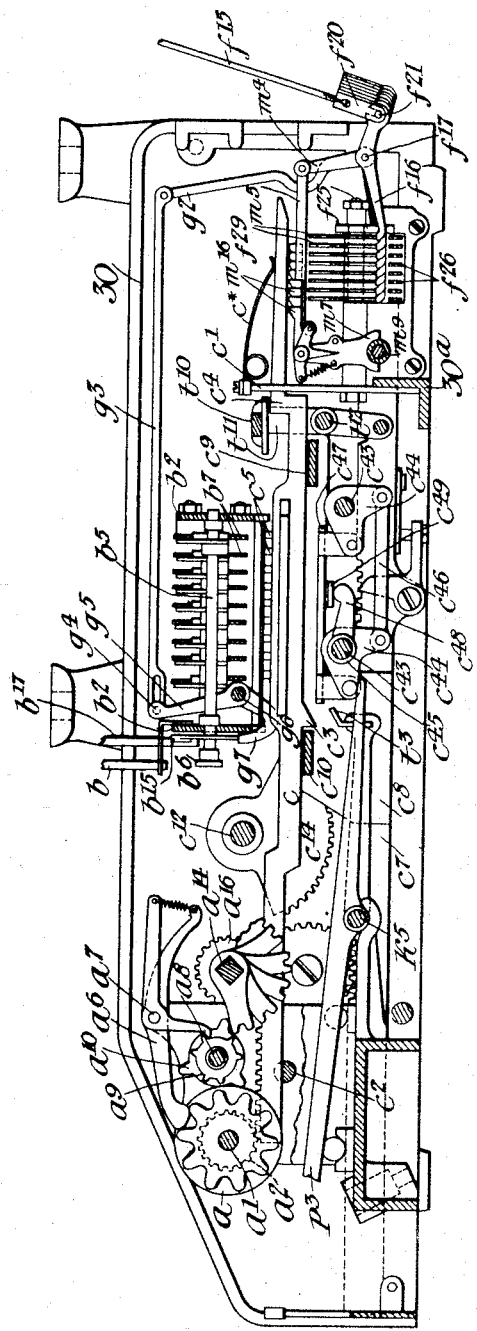
Fig. 3 is a vertical section, taken from the front toward the rear of the computing machine, approximately on the line $x^3$ $x^3$ of Fig. 2.

Attention is particularly called to Figs. 2 and 3. For each register comprising, as shown, nine digit bearing wheels, there is a series of eight register bars, to-wit, one for each register wheel, except the register wheel of highest order, which latter is at the extreme left. These register bars $c$ extend from front toward the rear of the machine, below the unit bars $b^7$, and hence at a right angle to the latter, and are independently movable. At their forward ends, the register bars $c$ have toothed rack portions that mesh with the gears $a^2$ of the respective register wheels $a$, and at their rear ends, said register bars are guided for longitudinal movements and are permitted limited vertical movements, by a guide comb or slotted plate $c^1$ that is rigidly secured, as shown, to a transverse bottom bar $30^a$ of the computer case 30. The rear ends of the register bars are yieldingly held down by light coiled springs $c^*$, best shown in Fig. 13. At their forward ends, said register bars $c$ slide over and are capable of a slight rocking action on a fulcrum rod $c^2$, supported by the register bearing brackets $30^c$. Each register bar $c$ at its intermediate portion, is provided with a depending lug $c^3$, and just forward of its guide comb $c^1$, each register bar is formed with a shoulder $c^4$, the purpose of which will appear later on.

Each register bar $c$ carries a series of nine vertically movable unit pins $c^5$, preferably mounted in thickened central portions of said bars, and yieldingly held by spring pressed balls, not shown. When the register bars $c$ stand in their normal positions, their unit pins $c^5$ will stand directly under the respective unit bars $b^7$, as best shown in Fig. 3, but lie far enough below the same, so that the depression of said unit bars will not engage the respective unit pins, unless the rear portion of a register bar is raised, by the decimal order selecting mechanism, in which case, the depression of any unit bar will force downward, into set position, the corresponding unit pin of such raised bar. The computer operating carriage or general operator, shown as made up of a pair of laterally spaced rack bars $c^7$, side plates $c^8$ rigidly secured to said rack bars, and a pair of transverse tie bars $c^9$ and $c^{10}$, is mounted to move within the computer case in a direction from front toward the rear. The carriage bar $c^9$, hereinafter designated as the push bar, normally stands a little rearward of the rearmost line of unit pin $c^5$ with its forward edge at such elevation, that when the operating carriage is moved forward, it will pass under the lower ends of such of the unit pins as have not been forced downward or set, but will engage any and all unit pins of the several register bars which have been pushed downward or set. As is evident, when the register bars are moved forward, into action on the register wheels, under the forward movement of the operating carriage, and by the action of the push bar $c^9$ on the set unit pins, the register bars will be given differential movements, unless the unit pins of like value have been set on all of the register bars. Under returning movement of the operating carriage, the bar $c^{10}$ thereof engages the depending lug $c^3$ of the forwardly moved register bars, and returns said bars to their normal positions.

Mounted in suitable bearings on the sides of the computer case 30 and extending above the register bars c, is an operating shaft $c^{12}$ having at its right hand end, a rigidly secured operating lever $c^{13}$, see Figs. 1 and 2, and having inside of the case 30, segmental gears $c^{14}$ that mesh with intermediate gears, not shown, but which in turn mesh with the rack bars $c^7$ of the operating carriage, so that the said operating carriage may be moved forward and rearward by oscillatory movements of said lever.

The means herein shown for imparting variable return movements to the typewriter carriage, or in other words, for bringing the typewriter carriage to different desired normal positions, toward the right, under constant or predetermined movements of the operating lever and of the operating carriage of the computer, is identical with that disclosed and claimed in my said companion application, and hence the parts thereof will be briefly noted as follows:

A flexible connection, such as a tape $c^{34}$, is attached to the free end of the typewriter line feed lever 21, and is passed over a guide sheave $c^{35}$ on a lug $c^{36}$ of the typewriter frame, and is then passed downward and secured to and adapted to be wound upon a grooved slack take-up wheel $c^{37}$. The wheel $c^{37}$ is suitably mounted in the adjacent side of the computer frame 30, and carries a spur pinion $c^{38}$ that meshes with the spur gear $c^{39}$, that is loosely journaled on the operating shaft $c^{12}$ adjacent to the operating lever $c^{13}$. The operating lever $c^{13}$ also carries a loose spur pinion $c^{40}$, that meshes with said gear $c^{39}$, and is adapted to be engaged with a similar spur pinion $c^{41}$, which latter also meshes with said gear $c^{39}$, and is journaled in the outer extremity on its supporting arm $c^{42}$, which as shown, straddles said gear $c^{39}$ and is loosely journaled on the operating shaft $c^{12}$. Preferably, the wheel $c^{37}$ is under tension from a light coiled spring (not shown), but which tends to rotate the same in the direction of the arrow in Fig. 1, so as to keep the tape $c^{34}$ from slack. Preferably also, the supporting arm $c^{42}$ engages the pinion $c^{41}$, under sufficient friction to prevent the said arm from being accidentally moved from any set position on the gear $c^{39}$. However, the set arm $c^{42}$ may be easily moved so as to set the pinion $c^{41}$ in any desired position on the gear $c^{39}$, and hence, normally any desired distance from the pinion $c^{40}$ that is carried by the operating lever $c^{13}$.

Figure 16:
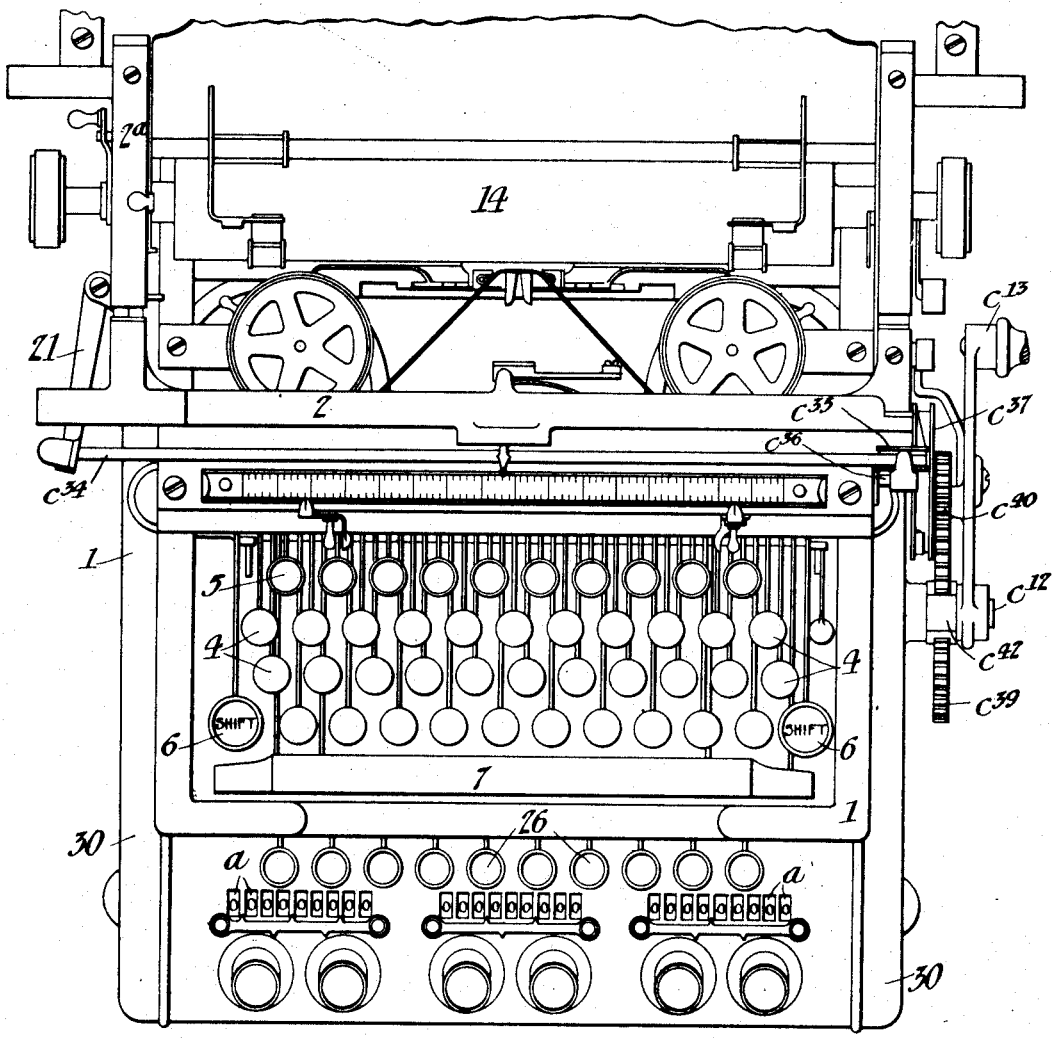
Fig. 16 is a plan view of the machine, with some parts broken away.

As is evident, when the operating lever $c^{13}$ is moved forward from its normal position, shown in Fig. 1, the typewriter carriage will remain stationary in its position toward the left, in respect to Fig. 16, until the pinion $c^{40}$ runs into engagement with the pinion $c^{41}$, whereupon the two pinions, by their opposing action or tendency to rotate the gear $c^{39}$ will lock said gear to the operating lever $c^{13}$, so that the subsequent or continued forward movement of said operating lever will positively rotate said gear $c^{39}$, the pinion $c^{38}$, and wheel $c^{37}$, and thereby return the typewriter carriage to a position at the right, that depends on the position in which the pinion $c^{41}$ is normally set in respect to the pinion $c^{40}$. Otherwise stated, the nearer said pinion $c^{41}$ is normally set to the pinion $c^{40}$, the further toward the right will be the position to which the typewriter carriage will be returned, under a complete forward movement of the operating lever $c^{13}$ and of the operating carriage.

It is evident that the frictional engagement between the pinion $c^{41}$ and its supporting arm $c^{42}$ is not required to prevent movement of said pinion and arm in respect to the gear $c^{39}$, when the two pinions $c^{40}$ and $c^{41}$ are engaged, for it is well understood that two pinions or gears engaged with each other and with a third pinion or gear, will interlock, so that no one of the three can rotate in respect to the other.

Such unit pins $c^{5}$, as have been pressed downward or set in one operation, for operative action on the register, must of course, be restored to normal positions before starting a new line. The means shown for accomplishing this result is identical with that disclosed and claimed in my said companion application. The parts thereof, in so far as shown in the drawings, includes a pair of transverse rods or shafts $c^{43}$ that are extended transversely of the case 30 below the register bars, and at their ends are mounted in the sides of said case. For each register and group of register bars, there are loosely journaled on the rods $c^{43}$, small bell-cranks $c^{44}$, connected in pairs by sleeves $c^{45}$, and connected for common movements, by links $c^{46}$. The upper arms of the four bell-cranks are pivotally connected to depending lugs of a unit pin restoring platform $c^{47}$, that directly underlies all the coöperating unit pins, when the register bars are in their normal positions, and which, when moved vertically, is held always in a true horizontal position, by said bell-cranks.

The front rod $c^{43}$ serves as a rock shaft and is provided with a short arm $c^{48}$ that is adapted to engage a projecting arm $c^{49}$ of the platform $c^{47}$. When the arm $c^{48}$ is moved upward into engagement with the arm $c^{49}$, it will raise the platform $c^{47}$, and the latter will restore to normal positions, all of the set unit pins; and this is accomplished at the final part of the return movement of the operating carriage, and at a time when all unit pins are directly over said platform, by means of a spring held cam acting dog clearly described in the said companion application. The platform $c^{47}$ also constitutes part of the so-called error correcting device. Of the other parts of this error correcting device, only the lever $p^{3}$ which is pivoted on shaft $k^{5}$ and operates on one of the bell-cranks $c^{44}$, is shown. This lever $p^{3}$ is preferably subject to key mechanism, such as shown in my companion application.

At the left hand side of each series of register bars $c$, is a zero bar $k$, of the same construction as said register bars, mounted to slide in the same way, but provided with only a single vertically movable and yieldingly held zero pin $k^1$, of the same construction as the unit pins, but which performs a different function. The manner in which this zero bar coöperates with other parts of the zero mechanism, is set forth in my said companion application, and hence need not here be repeated in detail.

In Fig. 3, the character $t^3$ indicates the stop blade of the so-called register bar intercepting stop, fully described in my said companion application, and not necessary for the purposes of this case to further consider.

Of the parts of the so-called register bar safety device, which is also clearly described in my said companion application, it is only necessary for the purposes of this case, to note the transverse bar $t^{10}$ thereof, see Fig. 3, which is carried by arms $t^{11}$ of the transverse rock shaft $t^{12}$.

All the parts of this application so far described are identical with corresponding parts in my said companion application.

*The register selector, decimal order selecting mechanism and associated parts.*

In my companion application, for each register and coöperating set of register bars, there is a selecting dog $f$ sometimes designated as a decimal order selector, which is carried by the typewriter carriage, and there is also a group of so-called selecting levers $f^1$ for each register and group of register bars. Also these several groups of selecting levers are arranged to operate through corresponding independent sets of transposing bars, to lift the register bars, in succession, from left toward the right, under movement of the typewriter carriage from right toward the left.

In my present machine, for each register and coöperating set of register bars, there is a selecting dog $f$, but these selecting dogs are arranged to operate, in succession, on a common set of selecting levers $f^1$, and this common set of selecting levers operates, through connections substantially like those employed in the machine in my companion application, on a set of transposing bars, which transposing bars in this instance, however, are common to the several sets of register bars. To render the common set of transposing bars and common set of selecting levers operative on the different sets of register bars, in the proper or desired order, or at different desired times, a so-called register selecting mechanism is provided. This register selecting mechanism preferably includes a cam block $m$ for each selecting dog $f$, and which is also carried by the typewriter carriage.

Interposed between the levers $f^1$ are other levers of identically the same construction designated by the letter $g$. These levers $g$, of which there are two, constitute elements of the punctuation-space key-locking mechanism.

In this improved machine, in addition to the levers $f^1$ and $g$, there are so-called register selecting levers $m^1$, as shown, three in number, or one for each register. These levers $m^1$ are different in construction from the levers $f^1$ and $g$, and they coöperate with the so-called register selecting cams or register selectors $m$, to determine which one of the registers shall be under the control of the decimal order selecting mechanism, and the numeral keys of the typewriter.

In the application of this improved decimal order selecting mechanism, the typewriter frame 1 is provided at its upper rear corners with rearwardly and upwardly extended laterally spaced arms $f^2$, that rigidly support the transverse rod $f^3$; and in front of the arms $f^2$, a pair of laterally spaced upwardly and rearwardly extended arms $f^4$ are rigidly secured to the rock shaft 9, to which it will be remembered, the vertically movable arms 8 of the vertically adjustable section $2^a$ of the typewriter carriage are rigidly secured. These arms $f^4$ support a pair of transverse rods $f^5$ and $f^6$, the former of which has two longitudinally extended grooves, and the latter of which has longitudinally spaced notches that correspond in the distance of their spacing, to the escapement movement of the typewriter carriage.

These selecting dogs $f$ which are in a direct line with each other, transverse of the machine, or in the direction of the carriage movement, so that they will operate in succession on the same levers $f^1$ and $g$, are spring held in their normal positions and are pivotally mounted in the rearwardly projecting ends of supporting blocks or arms $f^7$, that are independently pivoted on the rod $f^5$ and capable of independent sliding and pivotal adjustments.

At their free ends, the blocks $f^7$ are provided with depending teeth $f^8$, see Fig. 7, that engage notches of the rod $f^6$ to lock said blocks against sliding movements on the rod $f^5$. In a recess of each block $f^7$, is a spring pressed ball $f^9$ that normally engages the lower groove of the rod $f^5$, and holds the said arm down with its selecting dog $f$ in position for action on the forward ends of the levers $f^1$ and $g$, under the step by step movement of the typewriter carriage from right toward the left. Under the movement of the typewriter carriage from left toward the right, said selecting dog will move pivotally and pass under the forward ends of the levers $f^1$ and $g$. By reference to Fig. 8, it will be noted that the selecting dog $f$, at its upper end, is beveled so that it inclines in the direction of the operative movement of the typewriter carriage, and it will also be noted that the forward ends of the levers $f^1$ and $g$ are beveled in the same direction for engagement therewith, so that the selecting dog will lift directly upward the engaged ends of said levers, under the operative movement of the typewriter carriage.

The supporting blocks $f^7$, when moved pivotally upward, so that their spring pressed balls $f^9$ engage the upper groove of the rod $f^5$, will be held in a position to clear the levers $f^1$ and $g$, and their selecting dogs $f$ will then, of course, be rendered inoperative. Each block $f^7$ is provided with a pointer $f^{10}$, that works over a scale $f^{11}$, attached at its ends to the arms $f^4$. These pointers and scale coöperate to indicate the transverse positions on the sheet, where the particular selecting dogs will be thrown into action on the selecting levers.

One register selecting cam block $m$, or register selector, is rigidly attached to each of the selecting dog supporting blocks or arms $f^7$, as best shown in Figs. 4, 6 and 7. These so-called cam blocks $m$, are placed in such positions relative to coöperating register selecting levers $m^1$, that any cam block will lift the forward end of its coöperating lever $m^1$, and hold such lever in such raised position during the whole period of time that the corresponding selecting dog $f$ is in position during the travel of the carriage for action on any of the group of levers $f^1$ and $g$. As in my Patent 1,270,411, Fig. 4, the arms $f^4$ are connected to the case-shift mechanism, and in consequence when the case-shift mechanism is operated or rendered effective, said arms $f^4$ descend, thereby rendering ineffective the denomination-selectors $f$ and the selectors $m$ which select the registers or wheel groups.

As shown, the levers $m^1$ have heads or laterally bent front ends $m^2$, see Figs. 8 and 9, that are beveled in both directions of the travel of the typewriter carriage, so that the register selector or cam $m$ acts thereon in either direction of travel of the typewriter carriage.

It will also be noted, see particularly Figs. 4 and 6, that the heads $m^2$ of the levers $m^1$ extend on lines that are parallel to the carriage movement, but are offset or set in different positions from front toward the rear of the machine; and that the register selectors or cams $m$ are so located on the supporting blocks $f^7$, that they can operate only on corresponding levers $m$, or in other words, each lever $m^1$ can be actuated only by its own cam block or register selector $m$.

To support the group of levers $f^1$, $g$ and $m^1$, a pair of laterally spaced bearing plates $f^{12}$ are rigidly secured to the fixed supporting rod $f^3$, and the upper portions of these plates $f^{12}$ are connected by two parallel rods $f^{13}$ and $f^{14}$, upon the former of which, said levers $f^1$, $g$ and $m^1$, are intermediately pivoted. The rod $f^{14}$ acts as a stop to limit the downward movement of the forward ends of the levers $f^1$ and $g$, and it is preferably notched to assist in spacing the said levers, which levers are primarily spaced by collars or washers on the rod $f^{13}$. The forward ends of the levers $f^1$, $g$ and $m^1$ are spring pressed downward by means hereinafter noted.

The rear ends of all of the levers $f^1$, $g$ and $m^1$, are of the same construction, and in like manner, rest respectively on the upper ends of rods $f^{15}$, $g^1$ and $m^3$. The lower ends of the rods $f^{15}$, are connected to the rearwardly extended arms of lower selecting levers $f^{16}$; the lower ends of the rods $g^1$, are connected to rearwardly extended arms of bell-crank levers $g^2$; and the lower ends of the rods $m^3$, are connected to the rearwardly extended arms of bell crank levers $m^4$, see particularly Figs. 3, and 11 to 14 inclusive. All of the levers $f^{16}$, $g^2$ and $m^4$ are pivotally mounted on a shaft $f^{17}$, rigidly supported by the rear portion of the case 30.

The upper ends of the rods $f^{15}$, $g^1$ and $m^3$ are shown as detachably supported by a notched guide plate $f^{18}$, secured to the bearing plates $f^{12}$, and by coöperating bail $f^{19}$, the arms of which are pivoted on the rod $f^{13}$, see Figs. 6, 7 and 10. The lower ends of said rods $f^{15}$, $g^1$ and $m^3$ are shown as adjustably and detachably connected to their respective levers $f^{16}$, $g^2$ and $m^4$, by means of coupling heads $f^{20}$. The upper ends of these coupling heads $f^{20}$ are shown as split and provided with threaded seats into which the lower ends of said rods are screwed. The lower ends of said coupling heads $f^{20}$ are bifurcated so as to straddle the rear ends of said levers, and they are provided with pins $f^{21}$ that loosely rest in notches or open seats formed in the rear ends of the said levers $f^{16}$, $g^2$ and $m^4$. By reference particularly to Figs. 11, 12, 13 and 15, it will be noted that the lower selecting levers $f^{16}$ in a direction from right toward the left, project successively farther and farther forward, and at their rear ends, are correspondingly lengthened so as to maintain, in each lever, the same relative length from front to rear end.

Extending transversely over the forwardly projecting ends of the lower selecting levers $f^{16}$, and under the rear ends of the several sets of register bars $c$, is a series of eight parallel transposing bars $f^{23}$, that are common to the several registers, to the several sets of register bars and to the said single set or group of lower selecting levers. These transposing bars $f^{23}$ are supported for vertical, parallel movements by pairs of bell-cranks $f^{24}$, mounted on rods $f^{25}$ supported by the guide plate $c^1$. Preferably also the lower arms of the bell-cranks $f^{24}$ are connected by links $f^{26}$. As shown in Fig. 14, the left hand bell-crank $f^{24}$ limit the downward movements of the respective transposing bars $f^{23}$. Each transposing bar $f^{23}$ is connected by a coil spring $f^{27}$ to its underlying link $f^{26}$, that serves to yieldingly hold the former downward or in normal position.

Each transposing bar $f^{23}$ has a single depending lug $f^{28}$ and three upwardly extended lugs $f^{29}$. The lugs $f^{28}$ directly overlie the upturned forward ends of the lower selecting levers $f^{16}$, and the lugs $f^{29}$ directly underlie the rear ends of corresponding register bars $c$ of the three groups. More definitely stated, in the arrangement shown, the upturned end of the right hand selecting lever $f^{16}$ is arranged to engage the lug $f^{28}$ of the rearmost transposing bar $f^{23}$, and the lugs $f^{29}$ of this rearmost transposing bar directly underlie the left hand register bars $c$ of the three groups; and the left hand selecting lever $f^{16}$ is arranged to engage the lug $f^{28}$ of the most forward transposing bar $f^{23}$, and the lugs $f^{29}$ of this transposing bar are arranged directly below the right hand register bars $c$ of the three groups. Stated still in another way, the lugs $f^{28}$ are arranged obliquely in one direction and the three rows of lugs $f^{29}$ are alined obliquely in the other direction, and are so correlated to each other, and to the selecting levers $f^{16}$, and register bars $c$, that the said register bars may be raised under movement of the typewriter carriage from the right toward the left, in succession from left toward the right, this action however, requiring the coöperation of the so-called register selecting mechanism referred to above, and now further described in detail.

The upwardly extended arms of the bell-crank levers $m^4$ are pivotally connected to the rear ends of links $m^5$, the front ends of which are pivotally attached to rods $m^6$, which tie together the upper ends of plates $m^7$, the lower ends of which are secured to sleeves $m^8$ loosely journaled on a rod $m^9$, the ends of which are supported by the sides of the computer case 30. The sleeves $m^8$, plates $m^7$ and rods $m^6$ constitute rocking frames that are capable of being independently moved, one by each of the three bell-crank levers $m^4$. These frames are normally held in their rearmost positions, shown in Fig. 12, by springs $m^{10}$, attached to bell-crank levers $m^4$ and a fixed part of the machine, and they are adapted to be rocked rearward, as shown in Fig. 13, by the engagement of the corresponding register selecting cam $m$ with its coöperating lever $m^1$.

On each rod $m^6$, are pivoted side by side a plurality of small three armed bell-cranks $m^{11}$, one for each register bar. One arm of each bell-crank $m^{11}$ is provided with a laterally projecting pin or stud $m^{12}$, a second arm thereof extends downward and is limited in its movements, by a stop rod $m^{13}$ of the rocking frame, and a third arm of each bell crank is connected to a light coiled spring $m^{14}$, the lower end of which is connected to a rod $m^{15}$, also carried by the rocking frame.

On the same rod $m^6$, on which the bell-cranks $m^{11}$ are mounted, are also pivotally mounted a corresponding group of so-called coupling fingers $m^{16}$. These coupling fingers $m^{16}$ rest directly upon the studs $m^{12}$ of the corresponding bell-cranks $m^{11}$, and each of these fingers is of a different length from all the others. The light springs $m^{14}$ serve to hold the rear ends of coupling fingers $m^{16}$ clear of the lugs $f^{29}$ on the transposing bars $f^{23}$, when said fingers are moved rearward to operative positions, and said springs also assist in lifting the register bars $c$.

By reference to Figs 11, 12 and 13, it will be seen that the free ends of the coupling fingers $m^{16}$ underlie rear ends of register bars $c$ of the corresponding group, and furthermore, that the free ends of said coupling fingers are so arranged that when they are rocked slightly rearward, as shown in Fig. 13, the free end of each will directly overlie a corresponding lug $f^{29}$ of a transposing bar $f^{23}$, so that when a transposing bar is raised, the engaged coupling finger $m^{16}$ will be raised and the latter will lift up the overlying register bar $c$, as shown in Fig. 13. Of course, only one group of coupling fingers $m^{16}$ will be moved rearward at any one time, and the other two groups of fingers will then be held in inoperative positions, shown in Figs. 11 and 12, in which positions it will be noted, the free ends of the coupling fingers $m^{16}$, stand forward of their coöperating lugs $f^{29}$ so that said lugs will not engage said fingers when the transposing bar $f^{23}$ is raised. Stated in another way, the fingers $m^{16}$ when in their normal positions, shown in Figs. 11 and 12, do not lie far enough in the rear to be acted upon by corresponding lugs $f^{29}$ of the transposing bars $f^{23}$; but when a register selector $m$, through its connections above described, moves a set of coupling fingers $m^{16}$, corresponding to one or the other of the registers, rearward, said fingers $m^{16}$ will be in positions shown in Fig. 13, each finger overlying its corresponding lug $f^{29}$, and in such position, that when a transposing bar $f^{23}$ is raised to its uppermost position, by the decimal order selecting mechanism, the engaged finger $m^{16}$ will be raised and caused to lift the corresponding overlying register bar $c$, so that one of its unit pins will be set by a depressed unit bar.

It has already been stated, that there is one group of these coupling fingers or intermediate devices for each register and coöperating group of register bars, and that each group is controlled or rendered operative by its corresponding register selecting cam $m$ and its coöperating lever $m^1$.

The supporting blocks $f^7$ which carry corresponding selecting dogs $f$ and selecting cams $m$, are movable on their supporting rods $f^5$ and $f^6$, and hence, can be spaced apart as desired, so as to correspond with the spacing apart of the printed columns on the paper. Each register selector or selecting cam $m$, travels in a path of its own, and by the same means illustrated in my companion application, for connecting the blocks $f^7$ to the rod $f^5$, the said parts may be made detachable and interchangeable so that they can be placed in any order desired. If for instance, the work should require it, the right hand register may be selected for operation first, and the left hand register for operation last, or in just the reverse of the natural order of selection, such selection depending entirely on the order in which the register selecting cams $m$ are positioned on the supporting rods $f^5$ and $f^6$. As shown in Fig. 6, the left hand end of the rod $f^5$ is reduced at $f^{31}$, and the hubs of the blocks $f^7$, see Fig. 7, are provided with open notches $f^{32}$, so that said blocks $f^7$ may be removed from said rod or applied thereto, when moved to the said reduced end portion $f^{31}$.

With the arrangement of decimal order selecting mechanism and register selectors described, it is evident that cross footing may be made, that is, figures may be listed in a horizontal line on the printed sheet and the sum added. For instance, a piece of work like this may be done: 45.65; 163.22; 13.23; 5.02; .50; 1.00; 2274.20; 4.00=2506.82.

In the example just given eight numbers are added together, and to do this work, it will require eight supporting blocks $f^7$ with selecting dogs $f$ and selecting cams $m$, all of the same construction and arrangement, so that for each decimal order selecting dog thrown into action on the common group of selecting levers, the same set of register bars will be acted upon, and consequently, each of the several numbers accumulated on the same register.

Since the supporting blocks $f^7$ are adjustable on the rod $f^5$, and are detachably applied thereto, it is, of course, an easy matter to set the different supporting blocks with their corresponding selecting dogs and register selecting cams in positions for the various kinds of work.

In the drawings, see particularly Fig. 4, the said supporting blocks $f^7$ are so arranged, that when adding and listing numbers in columns, they will be printed on the sheet in columns corresponding to the location of the register upon which the amounts are being added or accumulated. For instance, when the amounts are being accumulated on the right hand register, the numbers will be printed on the right hand side of the printed sheet, and vice versa. By interchanging the right and the left hand blocks $f^7$, which are numbered 1 and 3 on Fig. 4, for identification by the operator, the operation will be changed to this extent, that the figures will be printed on the left hand side of the printed sheet when the amounts are being accumulated on the right hand register, and vice versa.

The herein described improvement in the decimal order selecting mechanism, while it makes necessary the use of register selecting means, nevertheless affords simpler construction than that disclosed in the companion application, because it provides for the use of a common or single set of register selecting levers, and a common or single set of so-called transposing bars.

Under the heading "Unit bars and their connections to numeral keys of the typewriter", reference has already been made to devices for preventing two numeral keys being simultaneously depressed, and also for preventing a numeral from being printed in punctuation spaces, the latter being accomplished as follows. When the typewriter carriage is in such position that the selector block $f^7$ is in the adding zone, the selector $f$ is either under the forward end of a lever $f^1$ or under lever $g$; if under the latter, the printing point on the paper is where a punctuation mark should be printed between the written columns of figures, or a space left open to clearly distinguish the grouping of such columns. Selector $f$ lifts up the forward end of lever $g$, as shown in Fig. 8, and the rearward end of said lever $g$ is forced down against the upper end of its corresponding rod $g^1$, which in turn depresses the rearwardly extending arm of bell-crank lever $g^2$, the long upwardly extending arm of which is connected to the rear end of link $g^3$, drawing the latter toward the rear of the machine; the forward end of link $g^3$ is connected to the upper free end of arm $g^5$ on rock shaft $g^6$ (Fig. 3), rocking the latter and thereby forcing the upwardly curved free end of lock arm $g^7$ attached to rock shaft $g^6$ upward and in between two of the rockers, or cam blocks $b^{15}$ on the forward side of cross frame $b^2$, which takes up all the play between said rockers, so that a numeral key cannot be depressed, or a numeral printed, until selector $f$ passes from under lever $g$ to the next lever $f^1$, when all the parts just described return to normal positions under the tension of a coiled spring $g^9$, shown in Fig. 17, one end of which is attached to the curved lock arm $g^7$ and the other end to the rear side of cross frame $b^2$. There are as many levers $g$, rods $g^1$, bell-crank levers $g^2$, links $g^3$ and arms $g^5$ (on rock shaft $g^6$) as required punctuation spaces, in the present case two of each, but in machines with registers of larger capacity more may be added.

If it is desired to vary the punctuation spaces with respect to the printed columns of figures, thus, from 111, 222, 00 to 11, 122, 200, it can be done by crossing rods $g^1$ with rods $f^{15}$ next to them, so that the upper ends of the latter will be under levers $g$, and rods $g^1$ under levers $f^1$, the lower ends of rods $g^1$ and $f^{15}$ remaining connected to their respective levers $g^2$ and $f^{16}$.

This application is a re-filing of my application filed December 10, 1908, allowed June 17, 1912, renewed December 18, 1912, No. 737,572, and a second time allowed March 2, 1914.

Variations may be resorted to within the scope of the invention, and portions of the improvements may be used without others.

Having thus described my invention, I claim:

1. In a computing machine, the combination with a plurality of registers having decimal orders, of register selectors, decimal order selectors, and means common to all of said register selectors and said decimal order selectors, for transmitting the selective action of the decimal order selectors to any selected one of the various registers to the exclusion of others of said registers.

2. In a recording computing machine, the combination with a register having decimal orders, of register actuating devices, decimal order selecting means normally inoperative, and means for selectively connecting said decimal order selecting means with the register actuating devices.

3. In a recording computing machine, the combination with a plurality of registers having decimal orders, of groups of register actuating devices, decimal order selecting means normally inoperative, and register selecting means for connecting said decimal order selecting means with any desired group of register actuating devices.

4. In a computing machine, the combination gith a plurality of registers having decimal orders, of groups of preliminary representation devices, decimal order selecting means, and register selecting devices for connecting any desired group of preliminary representation devices with said decimal order selecting means.

5. In a computing machine, the combination with a plurality of registers having decimal orders, of groups of preliminary representation devices, decimal order selecting means, and register selecting devices for bringing any desired group of preliminary representation devices under the control of the decimal order selecting means.

6. In a computer having a plurality of registers, the combination with groups of preliminary representation devices, of a single series of keys representing numerical (or digit) values, decimal order selecting means, and register selecting devices for connecting the keys to any group of preliminary representation devices.

7. In a combined typewriter and computing machine, the combination with a plurality of registers having decimal orders, of register actuating devices, a traveling paper supporting carriage, decimal order selecting means carried by said carriage, and traveling register actuators, each of which travels in a plane or path that is different from the plane or the path of the other, for determining which register shall be under the control of the decimal order selecting means.

8. In a combined typewriter and computing machine, the combination with a traveling carriage, a plurality of registers having decimal orders, a register selecting lever and cam block for each register, said selecting lever and cam block having motion to and fro relatively to each other, decimal order selecting means, and connections for bringing the decimal orders of any register under control of its decimal order selecting means.

9. In a computing machine, the combination with a plurality of registers having decimal orders, of a group of preliminary representation devices for each register, adapted to be independently set, and decimal order selecting mechanism which is, in part, common to all of said preliminary representation devices, but includes a decimal order selector proper, for each group of preliminary representation devices, and register selectors operative to determine the order in which said decimal order selecting mechanism will operate upon the different groups of preliminary representation devices.

10. In a computing machine, the combination with a plurality of registers having decimal orders, of a group of preliminary representation devices for each register, adapted to be independently set; decimal order selecting mechanism comprising, a group of selecting levers, several selecting dogs operative thereon, and transposing bars, common to the several groups of preliminary representation devices; and register selecting mechanism, operative to determine the order in which said decimal order selecting mechanism will operate upon the different groups of preliminary representation devices.

11. In a combined typewriter and computing machine, said typewriting mechanism having key controlled carriage, the combination with a plurality of registers having decimal orders, of a group of preliminary representation devices for each register, a common set of numeral keys with connections for independently setting said preliminary representation devices, decimal order selecting mechanism comprising, a group of selecting levers common to all registers, several selecting dogs operative thereon and carried by said typewriter carriage, transposing bars subject to said selecting levers and common to the several groups of preliminary representation devices, and a register selecting mechanism, controlled by the movement of said typewriter carriage and operative to determine the order in which said decimal order selector will operate upon different groups of preliminary representation devices.

12. In a computing machine, the combination with a plurality of registers, of register actuating mechanism, including a register selector and a decimal order selector rigidly connected together and mounted for common movements into operative and into inoperative positions.

13. In a computing machine, the combination with a plurality of registers, of register actuating mechanism, a common group of selecting levers, some of said levers connected to select the decimal orders of any register and others of said group connected to select the particular register to be actuated, and a register selector and a decimal order selector, for each register, and which decimal order selectors are operative, in succession, on the said common group of selecting levers.

14. In a computing machine, the combination with a plurality of registers having decimal orders, of decimal order selectors, a register selector and coöperating lever for each register, and devices actuated by said lever for connecting the decimal order selector with its corresponding register.

15. In a computing machine, the combination with a plurality of registers having decimal orders, of a plurality of decimal order selectors, a register selector for each register, register actuating means, and devices intermediate said register actuating means and said register selector, for transmitting the selective action of the decimal order selector to the register actuating means of the register that corresponds to the register selector in action.

16. In a computing machine, the combination with a plurality of registers having decimal orders, of register actuating devices, a plurality of decimal order selecting dogs, devices common to all of said register actuating devices and said selecting dogs, for transmitting the selective action of the latter to the former, a register selecting cam and cam lever for each register, a rocking frame for each cam lever, levers pivoted on said rocking frame and corresponding to the decimal orders of a register and adapted to connect the register actuating devices with the decimal order selecting mechanism.

17. In a computing machine, the combination with a plurality of registers having decimal orders, of register actuating devices, a plurality of decimal order selecting dogs, selecting levers common to all of said dogs, transposing bars common to all of said dogs and registers, and means actuated by the register selectors for operatively connecting the transposing bars to any desired register.

18. In a recording computing machine, the combination with a plurality of registers having decimal orders, of a traveling carriage having means for selecting the registers and the decimal orders of said registers, numeral printing devices, and means common to all of the decimal order selectors for preventing the printing of numerals in punctuation spaces.

19. In a recording computing machine, the combination with a plurality of registers having decimal orders, of a plurality of decimal order selectors, numeral printing devices, and means common to all of said decimal order selectors for preventing the printing of numerals in punctuation spaces.

20. In a recording computing machine, the combination with a plurality of registers having decimal orders, of a plurality of decimal order selectors, numeral keys and printing devices, and punctuation-space key-locking devices common to all of said decimal order selectors.

21. In a recording computing machine, the combination with a plurality of registers having decimal orders, of a decimal order selector for each register, numeral keys, printing devices, and punctuation-space key-locking devices common to, and operated by, all of said decimal order selectors.

22. In a recording computing machine, the combination with a plurality of registers having decimal orders, of a decimal order selector for each register, numeral keys, printing devices, punctuation-space key-locking devices common to, and operated by, all of said decimal order selectors, and means for arranging said locking devices with respect to the decimal order selection, so as to vary the location of the punctuation spaces as desired.

23. In a computing machine, the combination with a traveling carriage and a single series of denominational jacks, of a plurality of selectors on said carriage effective on said jacks, a plurality of registers selectively connectible to said jacks, a device for preventing the simultaneous operation of two keys, and a single comma lock comprising a dog coöperating with said simultaneous prevention device and connected to one or more of said jacks.

24. In a computing machine, the combination with a traveling carriage and a single series of denominational jacks, of a plurality of selectors settable independently of each other on said carriage, a plurality of registers, register selecting devices connected to said jacks, a device for preventing the simultaneous operation of two keys, and a single comma lock, comprising a dog coöperating with said simultaneous prevention devices and connected to one or more of said jacks.

25. In a computing machine, the combination with numeral keys and a traveling carriage, of a single series of levers, selectors on said carriage effective on said levers, a plurality of registers, bars movable to make said registers selectively effective, interponents movable between said bars and said registers to determine which register shall be effective, interponent controllers each associated with a selector, dogs for preventing the simultaneous operation of two keys, and a member coöperating with said dogs connected to one or more of said levers, to prevent the operation of a key at a letter space determined by said selector.

26. In a computing machine, the combination with a traveling carriage and selectors on said carriage, of a plurality of computing registers, interponents moved by said carriage to determine which register may be effective, and a comma-locking device effective independently of said interponents.

27. In a computing machine, the combination with a plurality of groups of computation members normally in ineffective position, of a traveling carriage, a series of bars for moving said computation members to effective position, interponents between said bars and said members, and means for selectively moving said interponents to determine on which members said bars shall be effective.

28. In a computing machine, the combination with numeral keys and a traveling carriage, of a series of groups of computation members, bars moved by said carriage for selecting said computation members, said bars extending transversely of said members and beneath them, a series of interponents selectively slidable between said bars and members, and springs for holding said interponents clear of said bars.

29. In a computing machine, the combination with a traveling carriage and a series of denomination selectors thereon, of a single set of levers movable by said selectors, a series of groups of computation members, a group selector associated with each denomination selector, a group of interponents controlled selectively by each group selector, and means whereby each denomination selector is effective on the computation members through the selected interponents.

30. In a combined typewriting and computing machine, the combination with numeral keys, a traveling carriage and a case shift mechanism, of a denomination selector, a plurality of groups of computing wheels, a group selector forming part of said carriage, and means for making said group selector ineffective when said case shift is effective.

31. In a combined typewriting and computing machine, the combination with numeral keys, a traveling carriage and a case shift mechanism, of a denomination selector, a plurality of groups of computing wheels, a group selector forming part of said carriage, and means for making both said selectors ineffective when the case shift mechanism is effective.

32. In a combined typewriting and computing machine, the combination with numeral keys, a traveling carriage and a case shift mechanism, of a denomination selector, a plurality of groups of computing wheels, a group selector forming part of said carriage and means for making said denomination selector ineffective when said case shift is effective.

33. In a combined typewriting and computing machine, the combination with numeral keys, a traveling carriage and a case shift mechanism, of a denomination selector, a plurality of groups of computing wheels, a group selector forming part of said carriage, a comma lock, and means for making said comma lock and said group selector ineffective when the case shift is effective.

34. In a combined typewriting and computing machine, the combination with numeral keys, a traveling carriage and a case shift mechanism, of a denomination selector, a plurality of groups of computing wheels, a group selector forming part of said carriage, a comma lock, and means for making said comma lock and both said selectors ineffective when the case shift is effective.

35. In a combined typewriting and computing machine, the combinatin with a traveling carriage and a plurality of groups of register wheels, of numeral keys, a case shift device, means for preventing the simultaneous operation of two numeral keys, a comma lock forming part of said simultaneous prevention device, a group selector forming part of said carriage, and means for making said selector and said comma lock ineffective when the case shift is effective.

36. In a combined typewriting and computing machine, the combination with numeral keys and a traveling carriage, of a case shift device, a series of groups of computing wheels, a group selector forming part of said carriage, a denomination selector forming part of said carriage, interponents controlled by said group selector and through which the denomination selectors are effective, and means for making said selectors ineffective when said case shift is effective.

37. In a computing machine, the combination with computation members, of denomination selecting bars extending transversely thereof and beneath them, interponents slidable to effective position between said bars and said members, springs supporting said interponents, a traveling carriage, and means for moving said interponents to effective position by said carriage.

38. In a computing machine, the combination with computation members, of denomination selecting bars extending transversely thereof and beneath them, interponents slidable to effective position between said bars and said members, springs supporting said interponents, a traveling carriage, means for moving said interponents to effective position by said carriage, a case shift for said carriage, and means for making the connections between said carriage and said interponents ineffective when said case shift is effective.

39. In a computing machine, the combination with computation members, of denomination selecting bars extending transversely thereof and beneath them, interponents slidable to effective position between said bars and said members, springs supporting said interponents, a traveling carriage, means for moving said interponents to effective position by said carriage, a comma-locking device, and means for making said comma-locking device ineffective when said case shift is effective.

40. In a combined typewriting and computing machine, the combination with numeral keys, a traveling carriage and a case-shift device, of a denomination selector, a plurality of groups of computing wheels, a group selector forming part of said carriage, and means for making said group selector ineffective when the case-shift device is effective.

41. In a combined typewriting and computing machine, the combination with numeral keys, a traveling carriage and a case-shift device, a plurality of groups of computing wheels, a group selector forming part of said carriage, a comma lock, and means for making said comma lock and both said selectors ineffective when the case-shift device is effective.

42. In a combined typewriting and computing machine, the combination with numeral keys and a traveling carriage, of a denomination selecting device forming part of said carriage, a case-shift device, a series of groups of computing wheels, a group selector forming part of said carriage, a denomination selector forming part of said carriage, interponents controlled by said group selector and through which the denomination selectors are effective, and means for making said selectors ineffective when the case-shift device is effective.

43. In a combined typewriting and computing machine, the combination with computation members, of denomination selecting bars extended transversely thereon and beneath them, interponents slidable to effective position between said bars and said members, springs supporting said interponents, a traveling carriage, means for moving said interponents to effective position by said carriage, a case-shift device and means for making connections between said carriage and said interponents ineffective when said case-shift device is ineffective.

44. In a computing machine, the combination with computation members, of denomination selecting bars extending transversely thereon and beneath them, interponents slidable to effective position between said bars and said members, a traveling carriage, means for moving said interponents to effective position by said carriage, a case-shift device, a comma locking device, and means for making said comma locking device ineffective when said case-shift device is effective.

45. In a computing machine, the combination with computation members, of denomination selecting bars extending transversely thereof, interponents slidable to effective position between said bars and said members, a traveling carriage, and means settable on said carriage for moving said interponents to effective position by movement of said carriage.

46. In a computing machine, the combination with computation members, of denomination selecting bars extending transversely thereof, interponents slidable to effective position between said bars and said members, a traveling carriage, means settable on said carriage for moving said interponents to effective position by movement of said carriage, and means settable on said carriage for moving said computation members to effective position by the movement of said carriage.

47. In a computing machine, the combination with a plurality of registers, of separate operating means for the different registers, denominational-selecting mechanism common to said registers, and coupling means to couple the operating means of any register to said denominational-selecting mechanism.

48. In a computing machine, the combination with a plurality of registers, of separate sets of racks for operating the different registers, denominational-selecting mechanism common to said registers, and means for coupling any one of said sets of racks with said denominational-selecting mechanism as desired.

49. In a computing machine, the combination with a traveling carriage, of a plurality of registers, separate operating means for the different registers, denominational-selecting mechanism common to said registers, and means controlled by the travel of said carriage for connecting different ones of said operating means with said denominational-selecting mechanism.

50. In a computing machine, the combination with computing mechanism, of a register, denominational-selecting mechanism for said register, operating means for said register, a plurality of other registers, operating means for each of said other registers, and means for selectively connecting the denominational-selecting mechanism with the first register or with either of said second-mentioned registers.

51. The combination with a typewriting mechanism including a carriage and numeral keys, of a computing mechanism including a series of dial wheels and bars for operating the dial wheels, means carried by said carriage for determining the individual operation of said bars, transposition linkages between said bars and said means, said transposition linkages being normally disconnected from said bars, and interponent mechanism between said transposition linkages and said bars, for completing the connection between said means and said bars.

52. The combination with a carriage, of a series of numeral keys, a series of computing wheels, a series of rack bars for said computing wheels, a series of carriage-operated floating interponents for shifting said rack bars by engagement therewith, and carriage-controlled means for controlling the effective and ineffective positions of said interponents.

53. The combination with a single series of denominational members, of a denomination selector therefor, a traveling carriage for said selector, a plurality of registers, alphabet and numeral keys, register-selecting means on said carriage, a comma-locking dog effective on said numeral keys, and means whereby said comma-locking dog may be variably connected to said denominational members.

54. The combination with a single series of denominational members, of a denomination selector therefor, a traveling carriage for said selector, a plurality of registers, alphabet and numeral keys, register-selecting means on said carriage, a comma-locking dog effective on said numeral keys, means whereby said comma-locking dog may be variably connected to said denominational members, typewriter types connected to said alphabet and numeral keys, a case-shift mechanism, and means for making said comma lock ineffective when said case shift is effective.

55. The combination with a single series of denominational members, of a denomination selector therefor, a traveling carriage for said selector, a plurality of registers, alphabet and numeral keys, register-selecting means on said carriage, devices operable by said denomination selector for locking said numeral keys against actuation when desired, and connections whereby said denomination selector may be made effective to so lock the keys in a plurality of different ways at will.

56. The combination with a single series of denominational members, of a denomination selector therefor, a traveling carriage for said selector, a plurality of registers, alphabet and numeral keys, register-selecting means on said carriage, devices operable by said denomination selector for locking said numeral keys against actuation when desired, connections whereby said denomination selector may be made effective to so lock the keys in a plurality of different ways at will, typewriter types connected to said alphabet and numeral keys, a case-shift mechanism, and means for making said lock ineffective when said case-shift is effective.

57. The combination of a carriage, a single set of denomination-controlling devices to coöperate with said carriage, a plurality of totalizers or registers, a general operator therefor, and means to connect said registers to said single set of denomination-controlling devices.

58. The combination of a carriage, a single set of denomination-controlling devices to coöperate with said carriage, a plurality of sets of indexing devices, means to connect said plurality of sets of indexing devices to said set of denomination-controlling devices, and a plurality of registers or totalizers to coöperate with said sets of indexing devices.

59. The combination of a carriage, a single set of denomination-selecting devices to coöperate with said carriage, a plurality of registers or totalizers, connections from said totalizers extending to said single set of denomination-controlling devices, indexing means for coöperation with said denomination-controlling devices and said registers, and a general operator to coöperate with the registers.

60. The combination with a plurality of totalizers or registers, each comprising a set of number wheels or devices, of drivers for said number wheels, a general operator to coöperate with said drivers, a carriage, a single set of denomination-selecting mechanism to coöperate with said carriage, means to connect said sets of drivers with said denomination-selecting mechanism, and indexing devices to determine the extent of movement of the drivers.

61. The combination with two totalizers or registers, each comprising number wheels or devices, of two sets of bars to drive said number wheels, a general operator to drive said bars, a carriage, a single set of denomination-selecting mechanism to coöperate with said carriage, means for connecting said sets of bars to said denomination-selecting mechanism, and indexing devices to determine the extent of movement of the bars.

62. The combination of three totalizers or registers, each comprising a series of number wheels or devices, individual drivers for said number wheels or devices, a carriage, a single set of denomination-controlling devices to coöperate with said carriage, indexing devices to coöperate with said drivers, and means for connecting said set of denomination-controlling devices with said sets of drivers.

63. The combination with a totalizer or register comprising number wheels or devices, of a set of drivers for said number wheels, a second totalizer or register, a second set of drivers therefor, a single denomination-selecting mechanism, indexing devices, and means for connecting said two sets of drivers and said indexing devices with said denomination-selecting mechanism.

64. The combination of a carriage, a single set of denomination-selecting devices to coöperate therewith, a plurality of registers or totalizers arranged side by side, a set of drivers for each register, a general operator to coöperate with the drivers, and indexing devices to coöperate with said denomination-selecting devices to enable the drivers to drive the registers the required extent.

65. The combination with a carriage, of a single set of denomination-controlling devices to coöperate with the carriage, a plurality of registers or totalizers, a set of drivers for each of said registers, indexing devices, and means to enable the carriage to coöperate with the indexing devices to control the extent of operation of the individual wheels in the totalizers, said means including individual connections extending from the drivers in one set to the drivers of corresponding denominations in the other set; so that any set is controllable by the single set of denomination-controlling devices.

66. The combination of a carriage, a single set of denomination-controlling devices to coöperate with said carriage, a plurality of registers or totalizers arranged side by side, connections ramifying from said single set of denomination-controlling devices to said registers, said connections including two sets of drivers, a general operator to coöperate with said drivers, and indexing means for coöperation with the general operator and said set of denomination-controlling devices and said registers.

67. The combination of a carriage, a single set of denomination-controlling devices to coöperate with said carriage, a plurality of totalizers or registers, a general operator therefor, and means for selectively connecting either of said registers to said denomination-controlling devices to the exclusion of the other register.

68. The combination of a carriage, a single set of denomination-controlling devices to coöperate with said carriage, a plurality of sets of indexing devices, means for selectively connecting either of said sets of indexing devices to said set of denomination-controlling devices, and a plurality of registers or totalizers to coöperate with said sets of indexing devices.

69. The combination of a carriage, a single set of denomination-selecting devices to coöperate with said carriage, a plurality of registers or totalizers, connections from said totalizers extending to said single set of denomination-controlling devices, indexing means for coöperation with said denomination-controlling devices and said registers, a general operator to coöperate with the registers, and means for selectively bringing into use the connections from either totalizer to the exclusion of the other totalizer.

70. The combination of a carriage, a single set of denomination-controlling devices to coöperate with said carriage, a plurality of sets of indexing devices, means controlled by the carriage for selectively connecting either of said sets of indexing devices to said set of denomination-controlling devices, and a plurality of registers or totalizers to coöperate with said sets of indexing devices.

71. The combination of a carriage, a single set of denomination-controlling devices to coöperate with said carriage, a plurality of totalizers or registers, a general operator therefor, and means for selectively connecting either of said registers to said denomination-controlling devices to the exclusion of the other register, said selective connecting means being connected to the carriage to be operated thereby.

72. The combination of a carriage, a single set of denomination-selecting devices to coöperate with said carriage, a plurality of registers or totalizers, connections from said totalizers extending to said single set of denomination-controlling devices, indexing means for coöperation with said denomination-controlling devices and said registers, a general operator to coöperate with the registers, and means controlled by said carriage for selectively bringing into use the connections from either totalizer to the exclusion of the other totalizer.

73. The combination with a plurality of totalizers or registers, each comprising a set of number wheels or devices, of drivers for said number wheels, a general operator to coöperate with said drivers, a carriage, a single set of denomination-selecting mechanism to coöperate with said carriage, means to connect either of said sets of drivers with said denomination-selecting mechanism to the exclusion of the other set, and indexing devices to determine the extent of movement of the drivers.

74. The combination with a plurality of totalizers or registers, each comprising a set of number wheels or devices, of drivers for said number wheels, a general operator to coöperate with said drivers, a carriage, a single set of denomination-selecting mechanism to coöperate with said carriage, means to connect either of said sets of drivers with said denomination-selecting mechanism to the exclusion of the other set, and indexing devices to determine the extent of movement of the drivers, said selective connecting means being operable by said carriage.

75. The combination of three totalizers or registers, each comprising a series of number wheels or devices, individual drivers for said number wheels or devices, a carriage, a single set of denomination-controlling devices to coöperate with said carriage, indexing devices to coöperate with said drivers, and means for selectively connecting any of said three sets of drivers with said denomination-controlling devices.

76. The combination of three totalizers or registers, each comprising a series of number wheels or devices, individual drivers for said number wheels or devices, a carriage, a single set of denomination-controlling devices to coöperate with said carriage, indexing devices to coöperate with said drivers, and means for selectively connecting any of said three sets of drivers with said denomination-controlling devices, said selective connecting means being operable by said carriage, and being adjustable relatively to said carriage, to vary the location of their zones of action.

77. The combination of a carriage, a single set of denomination-controlling devices to coöperate with said carriage, a plurality of sets of indexing devices, means to connect said plurality of sets of indexing devices in transposed denominational order to said set of denomination-controlling devices, and a plurality of registers or totalizers to coöperate with said sets of indexing devices.

78. The combination of a plurality of registers or totalizers, a carriage, a transposed denomination-controlling mechanism extending from said carriage to said totalizers and comprising only one set of denomination-controlling devices, and indexing means for coöperation with said denomination-controlling devices and said totalizers.

79. The combination with a plurality of totalizers or registers, each comprising a set of number wheels or devices, of drivers for said number wheels, a general operator to coöperate with said drivers, a carriage, a single set of denomination-selecting mechanism to coöperate with said carriage, means to connect said sets of drivers in reverse order with said denomination-selecting mechanism, and indexing devices to determine the extent of movement of the drivers.

80. The combination with a totalizer or register comprising number wheels or devices, of a set of indexing and driving devices for said number wheels, a second totalizer or register, a set of indexing and driving devices therefor, a single denomination-selecting mechanism, and transposed connections ramifying from said denomination-selecting mechanism to said sets of indexing and driving devices.

81. The combination with a carriage, of a single set of denomination-controlling devices to coöperate with the carriage, a plurality of registers or totalizers, a set of indexing and driving devices for each of said registers, and means to enable the carriage to coöperate with the indexing devices to control the extent of operation of the individual wheels in the totalizers, said means including individual transposed connections ramifying from the denomination-controlling devices to the sets of indexing and driving devices.

82. The combination of a carriage, a single set of denomination-controlling devices to coöperate with said carriage, a plurality of registers or totalizers arranged side by side, transposed connections ramifying from said single set of denomination-controlling devices to said registers, said connections including two sets of drivers, a general operator to coöperate with said drivers, and indexing means for coöperation with the general operator and said set of denomination-controlling devices and said registers.

83. The combination of a carriage, a single set of denomination-selecting devices to coöperate with said carriage, a plurality of registers or totalizers, connections from said totalizers extending to said single set of denomination-controlling devices, indexing means for coöperation with said denomination-controlling devices and said registers, a general operator to coöperate with the registers, and means individual to said registers and separately adjustable along said carriage, for bringing into use the connections from each totalizer.

84. The combination of a carriage, a single set of denomination-selecting devices to coöperate with said carriage, a plurality of registers or totalizers, connections from said totalizers extending to said single set of denomination-controlling devices, indexing means for coöperation with said denomination-controlling devices and said registers, a general operator to coöperate with the registers, and means individual to said registers and separately adjustable along said carriage, for bringing into use the connections from each totalizer; each of said individual means provided with a dog for operating the denomination-controlling devices.

85. In a combined typewriting and computing machine, the combination with typewriting mechanism including a carriage and numeral keys, of a plurality of registers, operating means individual to each register, digit-selecting mechanism including devices controlled jointly by said keys and carriage and common to all of said registers, and means for coupling the operating means of any register to said common selecting mechanism.

FREDERICK A. HART.

Witnesses:
W. O. WESTPHAL,
TITUS H. IRONS.